United States Patent Office 3,717,573
Patented Feb. 20, 1973

3,717,573
REMOVAL OF PETROLEUM HYDROCARBONS FROM WATER SURFACES
Joel Warren, Fort Lauderdale, Fla., assignor to Pfizer Inc., New York, N.Y.
No Drawing. Filed June 16, 1969, Ser. No. 833,725
Int. Cl. C02b 9/02
U.S. Cl. 210—40                6 Claims

ABSTRACT OF THE DISCLOSURE

A process for removing petroleum hydrocarbons from the surface of fresh or saline waters by dispersing magnetic iron oxide in the presence of wetting agent on the surface of oil-contaminated water, and removing oil-adsorbed metallic particles by means of magnetic attraction.

BACKGROUND OF THE INVENTION

Generally, it has been found that the pollution of waters by oil is a problem encountered in many harbors and navigable streams, and one which is controlled with various degrees of success.

The practical methods of oil removal fall into the two categories of mechanical oil recovery and of oil dissipation by chemical means.

The most effective method to control water pollution is undoubtedly to remove the oil entirely from the waters. This can rarely be achieved only by mechanical oil recovery methods, and then involves, in almost all cases, investment in costly equipment. Some of these mechanical methods and equipment are as follows:

The Baltimore oil recovery barge.—The vessel, a modified barge, is self-propelled by means of a 52-horsepower diesel-powered outboard propulsion and steering unit. The propulsion of the 38-foot vessel is primarily intended for moving the barge from a station to the location of an oil spill. The oil recovery unit is mounted in a sump at the forward end of the barge.

In principle, the system is based upon oil adhesion to a rotating cylinder. Only oil adheres to the special surface of the cylinder while the water is rejected; a wiper blade removes oil from the rotating cylinder. A small engine drives a hydraulic power generator for operation of the hydraulic motor of the pickup cylinder.

The unit in the oil recovery barge uses a total of four pickup cylinders. The three outside transfer the oil into an inside sump, where it is picked up by the fourth drum for deposit into a 3,000 gallon storage tank in the body of the barge. All cylinders are submerged about 9 inches deep into the water.

The system has been tested with 11 types of oil, including Bunker C, diesel oil, and gasoline, and has proved an average retrieving ability of more than 90% oil and less than 10% water, depending on the type of oil being removed. The best results are obtained with more viscous oils. It is, however, prerequisite that the speed of cylinder rotation is accurately and constantly controlled to prevent air and water inclusion in higher percentages.

To increase effectiveness of the system, a floating oil boom is normally used with the barge and the confined oil slick is drawn toward the oil recovery unit. In addition to increasing film thickness by means of an oil boom, lower oil temperatures, higher oil viscosity, assured oil film contact, and proper cylinder speed will improve the oil recovery rate.

Oil skimmer systems.—Oil skimmers attempt to skim off the oil film by means of a weir or a ramp which must be adjusted just below the water surface. It can be either part of a vessel itself or a separate unit fastened to it. The oil-water mixture is collected in a sump and from there to the storage tank. The best known example of this kind is the so-called "Norfolk Oil Skimmer."

This oil skimmer may be described as a 25 x 12-foot box-shaped barge with holes in the bottom to permit free passage of water. Flotation cells form the upper part of the barge while the lower part provides space for the recovered oil. The barge is fitted with a diffusion chamber just beneath the flotation cells. Oil and water flow into the skimmer sump at one end of the barge and are drawn out by a pump which transfers the liquid to the diffusion chamber. This chamber quiets the turbulence of the liquid, allowing it to pass through the many holes into the barge. The water passes out the bottom of the barge and the oil remains. Thus gravity separation of oil and water is provided.

The Norfolk Oil Skimmer is designed for use along a shipyard waterfront. It is not self-propelled and, therefore, the oil slick has to be drawn by salt water hoses. This requires several items of auxiliary equipment.

The design of the oil skimmer is simple and rugged and the operating costs are extremely low. The most important feature of the Norfolk System is that the hull is used as a storage tank and that the excess water leaves the barge automatically through the holes in the bottom. Therefore, the oil-water ratio is fairly unimportant with respect to the effectiveness of the system.

Other mechanical recovery equipment.—The other devices used for oil recovery are mainly "suction hoppers" and "vacuum nozzles." The "suction hopper" is actually a steel plate box with horizontal slots near the top and flexible suction line running from the bottom of the box to the barge pump. The "suction hopper" is lowered by a boom into the oil covered water, and the oil is recovered by a skimming process. The "vacuum process" uses approximately a 3-inch high by 12-inch-wide nozzle and a vacuum hose up to 50-feet long, which can be operated from a boat or the wharf. The oil-water mixture is collected in tanks and separated mechanically or by gravity.

Both methods attempt to skim the oil off the water surface. Due to the relative thinness of the oil film, it is necessary to have an accurate adjustment of the skimmer in order to minimize the subsequent oil separation process. Surface motion reduces the efficiency of this type of recovery device considerably. A rating of these methods on the basis of the previous list of desirable features indicated that only initial cost and compatibility with marine life can be scored positively.

Some adsorbent material, such as straw, rice hulls, peanut shells, etc., is often spread over the oil slick to absorb the oil but unfortunately it also absorbs a considerable quantity of water. The straw is picked up by pitchforks and then burned after drying. Besides the fact that this is a "messy" operation, it is costly due to the amount of manpower and time required.

Oil dissipation by chemical means.—In contrast to mechanical oil recovery, the following methods do not recover the oil from the water; they only absorb, emulsify, or disperse the oil slick by chemical means. For this reason, the 1962 International Conference on the Pollution of the Sea by Oil condemned all chemicals and other substances which sink, emulsify or disperse oil slicks. At best, these methods serve to dilute oil and do not actually alleviate pollution in respect to marine life. In fact, some of the chemicals such as petroleum-based agents add to the contamination.

On the other hand, there are situations where it is not possible or feasible to recover the oil and chemical methods are applied to solve the problem; for example, in case of oil spills under open type pile construction. This at times, is most difficult and as a result, it has been the practice to use chemical emulsifiers where the cost of labor for washing the oil out would greatly exceed the cost of using chemical emulsifiers. Unfortunately, most oil spills occur while ships are anchorer or berthed and the chances that the oil will be trapped under piers and between ships are great. It is therefore, advisable to give full consideration to chemical methods.

The use of *carbonized sand,* though usually unsatisfactory, is mentioned here for completeness. The method is more physical then chemical in nature and employs ordinary beach sand that has been coated with creosote oils and heat treated. The sand is blown over oil spills and tends to physically absorb and sink the oil to the bottom. It often happens that, after a period of not too many days, oil separates from the sand and rises to the water surface again. Chalk and talc are other physical absorbent agents that have been used.

Chemicals for oil slick removal are in general emulsifying and dispersing agents suitable to dissipate the surface oil into the water. There are a few exceptions such as chemicals which form a gel with the oil. This gel actually captures the oil and floats on the water surface where it can be removed by mechanical means. This method is quite costly as it involves the use of both chemicals and mechanical recovery equipment.

The chemicals in use for dissipation of oil are normally sprayed on the slick through a nozzle under moderate or high pressure in order to stir up the water and promote interaction between the oil water and the agent. Some of the chemicals are used in concentrated form, others are mixed with sea water in proportions up to five parts of water to one part of agent.

In comparing chemical and mechanical oil slick removal, it should be noted that in general only the chemical methods can be applied under all circumstances. The method is more versatile and more economical if the right agents are used. The major drawback is the harmfulness of emulsified oil and of the chemical agent itself to fish and marine life.

SUMMARY OF THE INVENTION

The present invention embodies a process for the removal of liquid pertoleum and its products from water surfaces by dispersion of granular or powdered magnetic iron oxide in combination with a wetting agent or detergent, and removing the resulting aggregate from the water surface by magnetic force.

DETAILED DESCRIPTION OF THE INVENTION

It has been found that the dispersion of magnetic metallic particles of iron oxide on the surface of oil in the presence of a suitable wetting agent results in adsorption of the oil by the magnetic particles to create a thick, viscous sludge which can then be removed by application of a suitable magnetic force.

This novel and efficient process for oil removal contains such basic features as reasonable cost, rapid recovery rate, and, most importantly, compatibility with marine life.

Light and heavy oils (Diesel No. 2, vacuum pump A and 90W transmission oil) are layered on the surface of fresh water and salt water. When powdered iron oxide ($Fe_2O_3$) is dispersed on the oil surface, a slimy mass is formed, quickly with agitation, more slowly if left undisturbed, and portions of the iron oxide fall through the film to the bottom of the container causing a small loss of oil. However, when a wetting agent is added either to the iron oxide or to the surface of the oil, the iron oxide particles become rapidly covered, the polar attraction of the iron oxide for oil exceeds that of the oil-water phase, and a heavy cohesive sludge forms which remains on the surface in the case of more viscous oils, or drops to the bottom with lighter oils. The iron oxide-oil sludge is easily removed with a magnet.

The wetting agent or detergent, which may be a mannide monooleate, a non-toxic complex mixture of polyoxyethylene ethers of mixed partial oleic esters of hexitol anhydrides, or a quaternary ammonium compound, is added to the oil at an optimum ratio to that of the dispersed oil which will vary with the viscosity of the oils. Sufficient magnetic iron oxide having an average particle size of about 0.05 to 0.25 micron is added to form a monolayer on the oil-water surface. Crude magnetic iron and iron oxides with larger particle sizes may also be effectively used.

The recovered oil may be removed from iron oxide sludge by treatment with a detergent, a hydrocarbon solvent or heating. This permits reuse of the iron oxide if economically feasible.

For large scale operations it is visualized that the coarse iron oxide powder and wetting agent will be blown or sprayed from a bulk ship equipped with horizontal booms. This will be followed by a towed magnetic rake or grid to pick up the magnetic oxide-oil sludge. A conveyer belt will dump this in a holding tank where the iron oxide can be reclaimed by treatment with a detergent and magnetic separator.

The following examples are merely illustrative and are not intended to limit the invention, the scope of which is defined by the appended claims.

EXAMPLE I

One part of SAE-30 viscosity vacuum pump oil is layered on the surface of 10 parts of a 2.8% sodium chloride solution in a glass vessel. To this is added 1 part of mannide monooleate (Arlacel A, Atlas Chemical Co., Wilmington, Del.), and the mixture is gently shaken. Finely powdered magnetic ferric oxide ($Fe_2O_3$), approximately 0.2–0.5 part, is then sifted onto the surface of the oil and the mixture again gently agitated. A spongy thick aggregate forms within seconds consisting of oil-covered iron oxide particles which float on the water surface. Immersion of a magnet into the vessel causes adherence of the oil sludge which can be completely removed as one mass, leaving the water essentially oil free.

EXAMPLE II

To 100 parts of tap water is added 5 parts of 90W transmission oil. One part of mannide monooleate (Arlacel A, Atlas Chemical Co., Wilmington, Del.) is added which causes the formation of a cloudy oil precipitate consisting of small droplets of the dispersed oil emulsion. Apprxoimately 0.2–0.5 parts of powdered magnetic ferric oxide having an average particle size of about 0.05 micron is added, and the mixture gently shaken. A portion of the viscous sludge, representing approximately 20% sinks to the bottom of the vessel as a cohesive mass. The remainder of the sludge is then removed with a magnet.

EXAMPLE III

The method of Example II is repeated using No. 2 diesel oil in place of 90W transmission oil, with comparable results.

EXAMPLE IV

The method of Example I is repeated to remove oil with viscosities between SAE–20 and SAE–40 using sorbitan monooleate (Tween 80, Atlas Chemical Co., Wilmington, Del.) in place of mannide monooleate, with comparable results.

EXAMPLE V

The method of Example I is repeated using a quaternary ammonium compound (Roccal, Sterwin Chemical Co., New York, N.Y.) in place of mannide monooleate, with comparable results.

EXAMPLE VI

The method of Example II is repeated, and the ferric oxide is recovered from the ferric oxide-oil sludge by treating the sludge with an excess of wetting agent, thus solubilizing the oil, and then washing the oil off the magnetic ferric oxide particles with clean water.

EXAMPLE VII

Magnetic $Fe_2O_3$ with a particle size of 1.0 micron is treated with 1 normal HCl for 15 minutes and then removed from the acid by magnetic attraction. The iron oxide is then washed with water. Treatment with the acid results in the formation of a spongy particle of large surface area.

10 gms. of the washed $Fe_2O_3$ is then added to 1 liter of an aqueous solution of 10% mannide monooleate (Arlacel A, Atlas Chemical Co., Wilmington, Del.) and exposed to a pressure of 20 lbs. sq. inch in a steam autoclave thus forcing the wetting agent into the interstices of the iron oxide. The latter is then removed from the solution, dried in air and then applied to the oil as described in Example I.

What is claimed is:

1. The method for the removal of the liquid petroleum and its products from water surfaces which comprises dispersing on the contaminated surface magnetic iron oxide ($Fe_2O_3$) in combination with a wetting agent, and subjecting the resulting ferric oxide-oil aggregate to magnetic force.

2. The method of claim 1 wherein said wetting agent is mannide monooleate.

3. The method of claim 1 wherein said wetting agent is sorbitan monooleate.

4. The method of claim 1 wherein said wetting agent is quaternary ammonium compound.

5. A process for recovery of magnetic ferric oxide from the ferric oxide-oil sludge of claim 1 which comprises treating the sludge with excess wetting agent, and then washing the oil off the magnetic ferric oxide particles with clean water.

6. In a process of scavenging an oil layer on a body of water; the steps which include:
spreading upon said oil layer a comminuted ferromagnetic oleophilic substance, and causing the latter to be taken up by the oil layer so as to form agglomerates; and subsequently collecting said agglomerates by magnetic attraction and physically separating them from said water.

References Cited
UNITED STATES PATENTS

| | | | |
|---|---|---|---|
| 2,367,384 | 1/1945 | Tymstra et al. | 210—40 X |
| 3,272,758 | 9/1966 | De Lew et al. | 210—42 X |

MICHAEL ROGERS, Primary Examiner

U.S. Cl. X.R.
210—DIG. 21, 222